(12) United States Patent
Kawata et al.

(10) Patent No.: US 9,070,333 B2
(45) Date of Patent: Jun. 30, 2015

(54) INFORMATION PROCESSING APPARATUS, INFORMATION PROCESSING METHOD, AND PROGRAM

(75) Inventors: Masaru Kawata, Nagano (JP); Keiichi Nakayama, Nagano (JP); Asako Doi, Tokyo (JP)

(73) Assignee: Sony Corporation, Tokyo (JP)

( * ) Notice: Subject to any disclaimer, the term of this patent is extended or adjusted under 35 U.S.C. 154(b) by 1239 days.

(21) Appl. No.: 12/497,936

(22) Filed: Jul. 6, 2009

(65) Prior Publication Data

US 2010/0007667 A1  Jan. 14, 2010

(30) Foreign Application Priority Data

Jul. 11, 2008  (JP) ................................ 2008-181360

(51) Int. Cl.
| | |
|---|---|
| G09G 5/36 | (2006.01) |
| G06F 1/32 | (2006.01) |
| G06F 3/14 | (2006.01) |
| G09G 3/36 | (2006.01) |
| G09G 5/00 | (2006.01) |

(52) U.S. Cl.
CPC .............. *G09G 5/363* (2013.01); *G06F 1/3203* (2013.01); *G06F 1/3265* (2013.01); *G06F 1/3293* (2013.01); *G06F 3/1438* (2013.01); *G09G 3/3611* (2013.01); *G09G 5/006* (2013.01); *G09G 2320/08* (2013.01); *G09G 2330/021* (2013.01); *Y02B 60/121* (2013.01); *Y02B 60/1242* (2013.01); *G09G 2360/06* (2013.01)

(58) Field of Classification Search
None
See application file for complete search history.

(56) References Cited

U.S. PATENT DOCUMENTS

| | | | |
|---|---|---|---|
| 2005/0244131 A1 | 11/2005 | Uehara | |
| 2007/0171230 A1* | 7/2007 | Iwase et al. | 345/519 |
| 2007/0234086 A1* | 10/2007 | Bernstein et al. | 713/310 |
| 2008/0030509 A1* | 2/2008 | Conroy et al. | 345/502 |

FOREIGN PATENT DOCUMENTS

JP  2007-179225  7/2007

OTHER PUBLICATIONS

Craig Stinson, Windows 95, Official Manual, ASCII Co., Ltd., First Edition, Jun. 11, 1999, p. 50-52.
U.S. Appl. No. 13/097,890, filed Apr. 29, 2011, Kawata, et al.

* cited by examiner

*Primary Examiner* — Maurice L McDowell, Jr.
(74) *Attorney, Agent, or Firm* — Oblon, McClelland, Maier & Neustadt, L.L.P.

(57) ABSTRACT

An information processing apparatus includes a first graphics chip, a second graphics chip, a detection unit, and a display unit. The first graphics chip has a first drawing processing capacity. The second graphics chip has a second drawing processing capacity different from the first drawing processing capacity. The detection unit detects a request to change over from an execution of the first graphics chip to an execution of the second graphics chip. The display unit displays a first window prompting to close an application in execution, in a case where the detection unit detects the request to change over from the execution of the first graphics chip to the execution of the second graphics chip.

18 Claims, 12 Drawing Sheets

INFORMATION PROCESSING APPARATUS, INFORMATION PROCESSING METHOD, AND PROGRAM

BACKGROUND OF THE INVENTION

1. Field of the Invention

The present invention relates to an information processing apparatus including graphics chips performing drawing processing, an information processing method, and a program.

In recent years, along with enhancement of the performance of an information processing apparatus such as a personal computer (PC), a high drawing processing capacity is demanded for a graphics chip that performs drawing processing in the information processing apparatus. Meanwhile, particularly for a notebook type PC, low power consumption and elongation of the battery duration are also demanded.

Generally, graphics chips have the following reciprocity. That is, a graphics chip having a high drawing processing capacity exhibits high power consumption. Meanwhile, a graphics chip exhibiting low power consumption has a drawing processing capacity lower than the drawing processing capacity of the graphics chip exhibiting high power consumption. Conventionally, when mounting a graphics chip to a notebook type PC, it cannot be avoided to select either one of a graphics chip which has a high drawing processing capacity but exhibits high power consumption and another graphics chip which has a low drawing processing capacity but exhibits low power consumption.

2. Description of the Related Art

In view of the above, recently, there is provided a notebook type PC including two types of graphics chips and capable of using one of the graphic chips by changing over the graphics chips as disclosed in Japanese Patent Application Laid-open No. 2007-179225 (paragraph 0090, FIG. 6) (hereinafter, referred to as Patent Document 1).

SUMMARY OF THE INVENTION

However, Patent Document 1 teaches that, in a case of changing over the graphics chips, a user is required to restart an operating system (OS), which is inconvenient for the user.

In view of the above-mentioned circumstances, it is desirable to provide an information processing apparatus, an information processing method, and a program, capable of safely and easily changing over graphics chips having different drawing processing capacities, in accordance with the intended use.

According to an embodiment of the present invention, there is provided an information processing apparatus including a first graphics chip, a second graphics chip, a detection means, and a display means. The first graphics chip has a first drawing processing capacity. The second graphics chip has a second drawing processing capacity different from the first drawing processing capacity. The detection means detects a request to change over from an execution of the first graphics chip to an execution of the second graphics chip. The display means displays a first window prompting to close an application in execution, in a case where the detection means detects the request to change over from the execution of the first graphics chip to the execution of the second graphics chip.

In the information processing apparatus of this embodiment, the display means displays a first window prompting to close an application in execution, in a case where the detection means detects the request to change over from the execution of the first graphics chip to the execution of the second graphics chip. The displayed first window can prompt a user to safely and easily change over the graphics chips.

The information processing apparatus of this embodiment may further include a confirmation means for confirming if the application in execution is closed, in a case where the display means ends to display the first window. The display means may display a second window prompting again to close the application in execution, in a case where the confirmation means confirms that the application in execution is yet to be closed.

In the information processing apparatus of this embodiment, the confirmation means confirms if the application in execution is closed, in a case where the display means ends to display the first window. Accordingly, it is possible to further safely and easily change over the graphics chips. In addition, the display means displays a second window prompting again to close the application in execution, in a case where the confirmation means confirms that the application in execution is yet to be closed. As a result, even if there is a fear in that the changeover of the graphics chips may not be performed safely, it is possible to prompt again a user to safely and easily perform the changeover of the graphics chips.

The information processing apparatus of this embodiment may further include a changeover means and a control means. The changeover means accepts an input operation for changing over from the execution of the first graphics chip to the execution of the second graphics chip. The control means changes over from the execution of the first graphics chip to the execution of the second graphics chip, based on the input operation accepted by the changeover means.

In the information processing apparatus of this embodiment, the changeover means is capable of accepting an input operation by a user, and the control means changes over the execution of the graphics chips based on the input operation by the user. Since the graphics chips are changed over based on the input operation by the user, it is possible to prevent unintended changeover of the graphics chips. So, the changeover of the graphic chips can be performed safely.

In the information processing apparatus of this embodiment, the detection means may detect the input operation accepted by the changeover means.

In the information processing apparatus of this embodiment, in a case where the changeover of the graphics chips is requested through the input operation by a user accepted by the changeover means, the display means displays a first window prompting to close an application in execution. The displayed first window can prompt a user to safely and easily change over the graphics chips.

In the information processing apparatus of this embodiment, the detection means may detect a request to generate an output signal for the second graphics chip. The first window may further prompt to input the operation to the changeover means.

In the information processing apparatus of this embodiment, in a case where the detection means detects a request to generate an output signal for the second graphics chip, the display means displays a first window prompting to close an application in execution. The displayed first window further prompts to input an operation to the changeover means. The displayed first window can prompt a user to safely and easily change over the graphics chips.

In the information processing apparatus of this embodiment, the detection means may detect returning from a power saving mode. The first window may further prompt to input an operation to the changeover means.

In the information processing apparatus of this embodiment, in a case where the detection means detects returning from a power saving mode as a changeover request, the display means displays a first window prompting to close an application in execution. The displayed first window further prompts to input an operation to the changeover means. The displayed first window can prompt a user to safely and easily change over the graphics chips.

According to an embodiment of the present invention, there is provided an information processing method, including detecting a request to change over from an execution of a first graphics chip having a first drawing processing capacity to an execution of a second graphics chip having a second drawing processing capacity different from the first drawing processing capacity, and displaying a first window prompting to close an application in execution, in a case where the request to change over from the execution of the first graphics chip to the execution of the second graphics chip is detected.

In the information processing method of this embodiment, in a case where a request to change over from an execution of a first graphics chip to an execution of a second graphics chip is detected, a first window prompting to close an application in execution is displayed. The displayed first window can prompt a user to safely and easily change over the graphics chips.

The information processing method of this embodiment may further include ending the display of the first window and confirming if the application in execution is closed, and displaying a second window prompting again to close the application in execution, in a case where it is confirmed that the application in execution is yet to be closed.

In the information processing method of this embodiment, it is confirmed if the application in execution is closed in a case where the display of the first window is ended. Accordingly, it is possible to further safely and easily change over the graphics chips.

In addition, a second window prompting again to close the application in execution is displayed, in a case where it is confirmed that the application in execution is yet to be closed. As a result, even if there is a fear in that the changeover of the graphics chips may not be performed safely, the displayed second window can prompt again a user to safely and easily perform the changeover of the graphics chips.

The information processing method of this embodiment may further include accepting an input operation for changing over from the execution of the first graphics chip to the execution of the second graphics chip, and changing over from the execution of the first graphics chip to the execution of the second graphics chip, based on the input operation.

In the information processing method of this embodiment, since the graphics chips are changed over based on the input operation by a user, it is possible to prevent unintended changeover of the graphics chips. So, the changeover of the graphic chips can be performed safely.

According to an embodiment of the present invention, there is provided a program causing an information processing apparatus to execute the steps of detecting a request to change over from an execution of a first graphics chip having a first drawing processing capacity to an execution of a second graphics chip having a second drawing processing capacity different from the first drawing processing capacity, and displaying a first window prompting to close an application in execution, in a case where the request to change over from the execution of the first graphics chip to the execution of the second graphics chip is detected.

The program of this embodiment causes an information processing apparatus to display, in a case where a request to change over from an execution of a first graphics chip to an execution of a second graphics chip is detected, a first window prompting to close an application in execution. The displayed first window can prompt a user to safely and easily change over the graphics chips.

The program of this embodiment further causes the information processing apparatus to execute the steps of ending the display of the first window and confirming if the application in execution is closed, and displaying a second window prompting again to close the application in execution, in a case where it is confirmed that the application in execution is yet to be closed.

The program of this embodiment causes the information processing apparatus to end the display of the first window, and to confirm if the application in execution is closed. Accordingly, it is possible to further safely and easily change over the graphics chips.

Further, the program causes the information processing apparatus to display a second window prompting again to close the application in execution, in a case where it is confirmed that the application in execution is yet to be closed. As a result, even if there is a fear in that the changeover of the graphics chips may not be performed safely, it is possible to prompt again a user to safely and easily perform the changeover of the graphics chips.

The program of this embodiment further causes the information processing apparatus to execute the steps of accepting an input operation for changing over from the execution of the first graphics chip to the execution of the second graphics chip, and changing over from the execution of the first graphics chip to the execution of the second graphics chip, based on the input of the operation.

The program of this embodiment causes the information processing apparatus to accept an input operation for changing over the graphics chips based on the input operation by the user. Since the graphics chips are changed over based on the input operation by the user, it is possible to prevent unintended changeover of the graphics chips. So, the changeover of the graphic chips can be performed safely.

As described above, according to the information processing apparatus, the information processing method, and the program of the present invention, it is possible to safely and easily change over the graphics chips having different drawing processing capacities in response to an object of utilization of the user.

These and other objects, features and advantages of the present invention will become more apparent in light of the following detailed description of best mode embodiment thereof, as illustrated in the accompanying drawings.

DESCRIPTION OF PREFERRED EMBODIMENT

Configuration of Information Processing Apparatus

Figure 1:
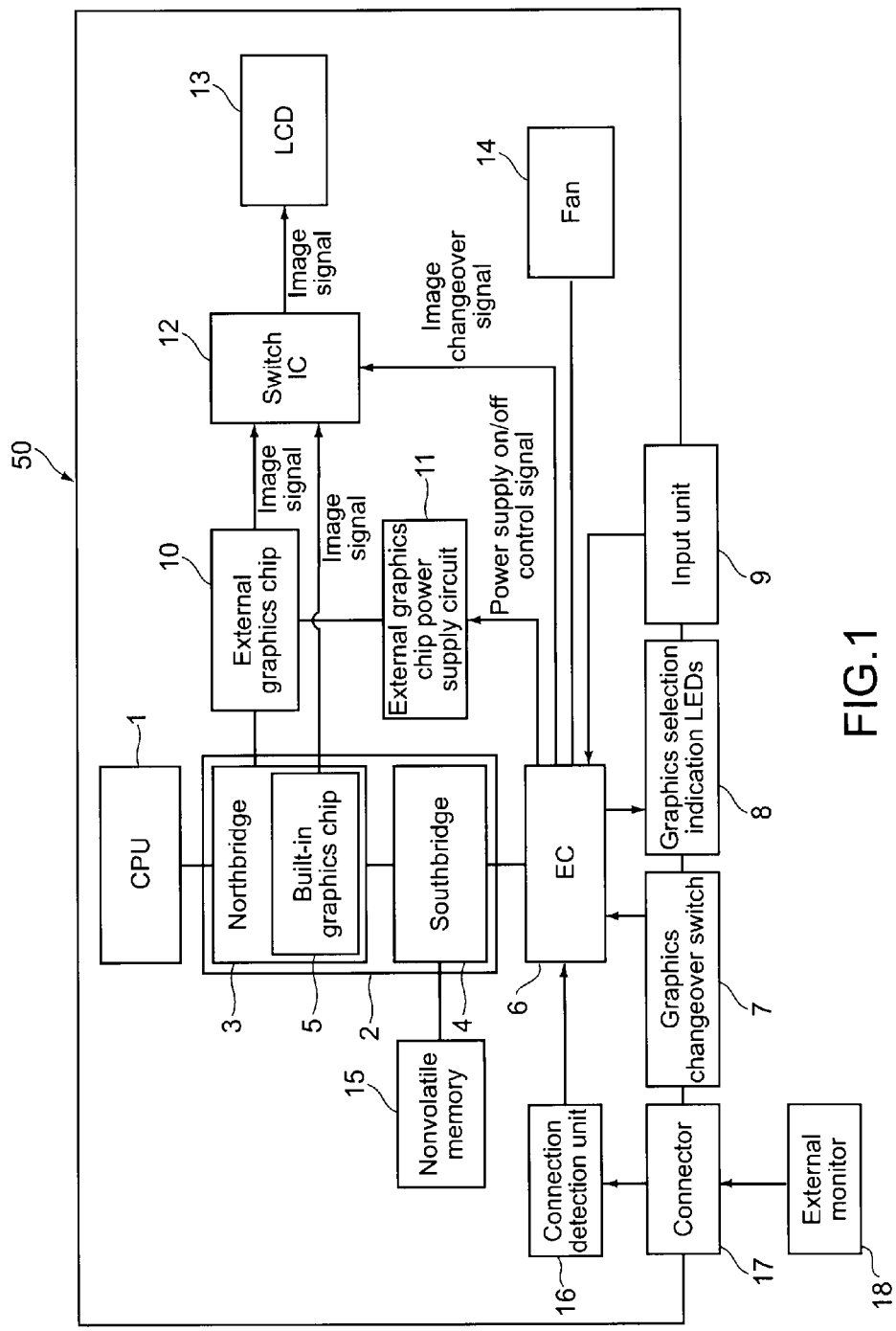
FIG. 1 is a hardware block diagram showing a configuration of a notebook type PC according to an embodiment of the present invention.
Figure 2:
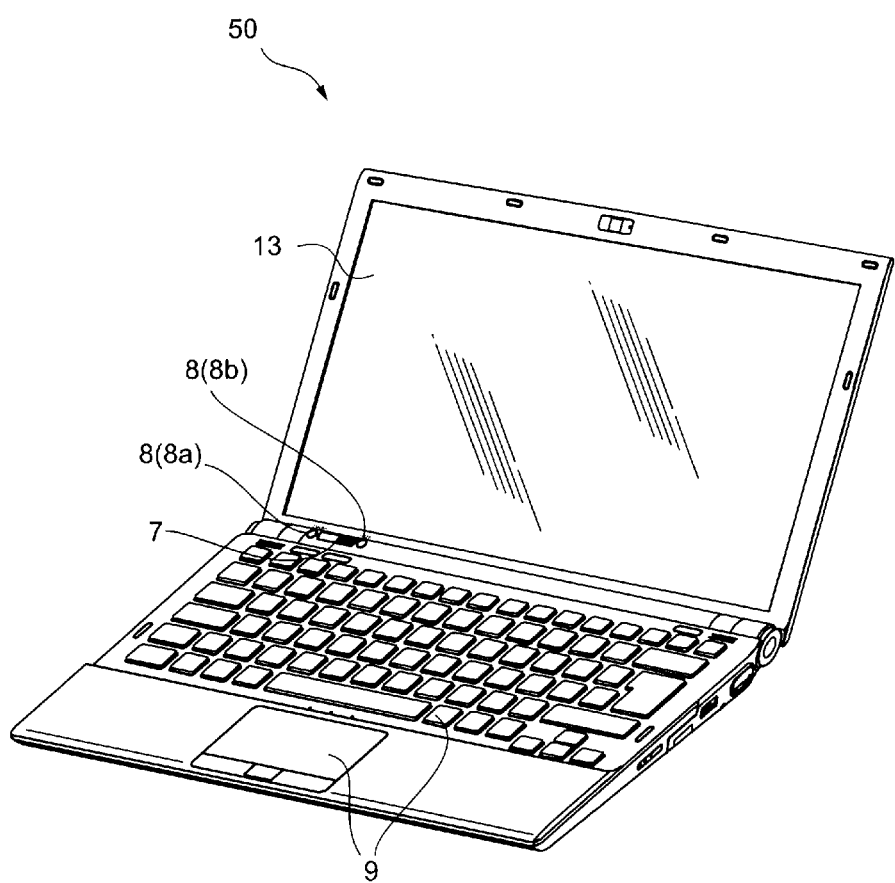
FIG. 2 is a perspective view showing the notebook type PC of FIG. 1.

Hereinafter, an embodiment of the present invention will be described with reference to the drawings. FIG. 1 is a hardware block diagram showing a configuration of a notebook type PC according to an embodiment of the present invention. FIG. 2 is a perspective view showing the notebook type PC of FIG. 1.

Referring to FIG. 1, a notebook type PC 50 (information processing apparatus) of this embodiment includes a chipset 2 for managing transfer of data between respective devices of the notebook type PC 50. The chipset 2 includes a northbridge 3 and a southbridge 4.

The northbridge 3 includes a built-in graphics chip 5, a memory controller (not shown), and the like built therein. The northbridge 3 is connected to a central processing unit (CPU) 1 and an external graphics chip 10. The southbridge 4 has connection interfaces connecting to peripheral devices including a nonvolatile memory 15 and an embedded controller (EC) 6.

The built-in graphics chip 5 and the external graphics chip 10 perform drawing processing based on data received from the CPU 1, and output a resulting image signal to a switch IC 12 so as to be displayed on an liquid crystal display (LCD) 13. In this embodiment, the external graphics chip 10 has a drawing processing capacity higher than that of the built-in graphics chip 5.

Although the built-in graphics chip 5 has the drawing processing capacity lower than that of the external graphics chip 10, the power consumption of the built-in graphics chip 5 is lower than that of the external graphics chip 10. On the other hand, while the external graphics chip 10 has a higher drawing processing capacity such that the external graphics chip 10 can perform a 3-D processing, a high resolution drawing processing, and the like, the power consumption of the external graphics chip 10 is higher than that of the built-in graphics chip 5, because the external graphics chip 10 drives itself and the peripheral devices. As a result, the power load with respect to the entire system of the notebook type PC 50 becomes high.

That is, the external graphics chip 10 is useful in a case where an external monitor 18 is connected to a connecter 17 of the notebook type PC 50 via a High-Definition Multimedia Interface (HDMI) terminal or a Digital Visual Interface (DVI) terminal, for example. Also, the external graphics chip 10 is useful in a case of connecting an alternating current (AC) adapter to the connector 17, driving a Blu-ray Disc drive, executing a 3-D application, and displaying a high-resolution image, for example. The built-in graphics chip 5 is useful in a case where the AC adapter is removed, a battery value is decreased to a threshold, and temperature of the battery is increased to a threshold, and in a case of lowering rpm of a fan to decrease a noise, for example.

In this embodiment, the above characteristics of the built-in graphics chip 5 are referred to as "STAMINA", and the above characteristics of the external graphics chip 10 are referred to as "SPEED". Similarly, a state where the built-in graphics chip 5 is executed is referred to as "STAMINA mode", and a state where the external graphics chip 10 is executed is referred to as "SPEED mode".

It should be noted that "execution" of a graphics chip means to control power supply to cause one of the built-in graphics chip 5 and the external graphics chip 10 to output an image signal.

In this embodiment, the built-in graphics chip 5 and the external graphics chip 10 having different drawing processing capacities as described above can be selectively used to perform drawing processing.

The nonvolatile memory 15 is, for example, a Read Only Memory (ROM), an Electrically Erasable and Programmable Read Only Memory (EEPROM), a flash memory, or the like.

The EC 6 has a keyboard controller (KBC) function for controlling an input unit 9 including a keyboard, a touchpad, a mouse, and the like, and an ACPI/EC function for managing power supply corresponding to the Advanced Configuration and Power Interface (ACPI) standards for power control. Further, the EC 6 includes a shared memory space for transferring data with a Basic Input/Output System (BIOS) (described later).

The EC 6 detects a depression operation of the input unit 9 by a user with the KBC function thereof, and issues a notification of information called scan code to a higher order system such as an OS. Further, the EC 6 has an interface for communication with a BIOS, and transmits and receives a command and data with the BIOS.

The EC 6 is connected to a graphics changeover switch 7 (performance changeover switch), a graphics selection indication light emitting diodes (LEDs) 8 (8a, 8b), an external graphics chip power supply circuit 11, a fan 14, and a connection detection unit 16.

The graphics changeover switch 7 is operated by a user to select one of the built-in graphics chip 5 and the external graphics chip 10 to be used. As shown in FIG. 2, the graphics changeover switch 7 is a mechanical switch such as a slide switch and provided close to the input unit 9.

In selecting one of the built-in graphics chip 5 and the external graphics chip 10, it may be possible to employ a graphical user interface (GUI) switch realized by application software, utility software, or other software provided in the notebook type PC 50. In this case, however, operations including a plurality of steps of finding out pertaining application software, starting the application software, and performing an inputting operation for changing over the graphics chips are required, and also high knowledge is required. In this embodiment, the graphics changeover switch 7 being a mechanical switch enables a user to select the graphics chips without performing complicated operations.

The graphics selection indication LEDs 8 (8a, 8b) notify, when one of the LEDs 8 (8a, 8b) is lit, the user of which one of the graphics chips is executed. As shown in FIG. 2, the graphics selection indication LEDs 8 (8a, 8b) are provided close to the both sides of the graphics changeover switch 7. For example, the graphics selection indication LEDs 8 are two LED indication elements, and one of the graphics selection indication LEDs 8 is lit corresponding to the selected graphics chip. In order for a user to visually and easily confirm which graphics chip is selected, one graphics selection indication LED 8a may be provided with a sign of "STAMINA", and the other graphics selection indication LED 8b may be provided with a sign of "SPEED".

Conventionally, a user confirms which one of graphics chips is selected by using a device manager on Microsoft Windows Vista (registered trademark), an OS used in general. In order to open the device manager, there are required a plurality of complicated steps including starting the "control panel", selecting the "system and maintenance", selecting the "system", selectively executing the "device manager" from the "task" list, and selecting the "display adapter" on tree-structured display. Such complicated steps are quite unfamiliar to general users. Therefore, in this embodiment, the above-mentioned LED display function is employed such that a user can visually confirm the selected graphics chip easily without performing any complicated operation.

The external graphics chip power supply circuit 11 changes over power supply to the external graphics chip 10 between supplying and non-supplying states in accordance with a power supply on/off control signal output from the EC 6. That is, when the built-in graphics chip 5 is used, the function of the external graphics chip 10 is disabled. At the same time, the external graphics chip power supply circuit 11 stops power supply to the external graphics chip 10 and peripheral circuits so that the power consumption of the entire notebook type PC 50 can be suppressed.

It should be noted that a power supply setting where the external graphics chip power supply circuit 11 is turned on to supply power to the external graphics chip 10 is referred to as "normal setting". A power supply setting where the external graphics chip power supply circuit 11 is turned off to stop the power supply to the external graphics chip 10 is referred to as "stamina setting".

The fan 14 radiates heat generated by the CPU 1 and other components of the notebook type PC 50. The EC 6 may also control driving of the fan 14 in accordance with the selection condition of the graphics chips. For example, when the built-in graphics chip 5 is executed, rpm of the fan 14 is lowered than that when the external graphics chip 10 is executed. Consequently, it is possible to properly control the fan 14 in accordance with the selected graphic chip.

The connection detection unit 16 is connected to the EC 6 and to the connector 17 provided to a case of the notebook type PC 50. The external monitor 18, for example, is connected to the connector 17. The connection detection unit 16 detects that the external monitor 18 is connected to the connector 17. The connection of the external monitor 18 detected by the connection detection unit 16 is transferred to the EC 6.

The switch IC 12 outputs an image signal selectively output from one of the built-in graphics chip 5 and the external graphics chip 10 to the LCD 13. The EC 6 outputs an image changeover signal to the switch IC 12 in accordance with the selection condition of the graphics chips so as to control changeover the image signals output from the graphic chips.

The LCD 13 is a liquid crystal display panel built in the notebook type PC 50 of FIG. 2. Alternatively, a display externally connected to the connector 17 of the notebook type PC 50 via a High-Definition Multimedia Interface (HDMI) terminal or a Digital Visual Interface (DVI) terminal may be used. In this embodiment, the built-in graphics chip 5 and the external graphics chip 10 are not provided with independent display units respectively, but the built-in graphics chip 5 and the external graphics chip 10 share a display unit. The image signals output from the respective graphic chips are changed over based on the image changeover signal output from the EC 6 to the switch IC 12.

It should be noted that the notebook type PC 50 has necessary functions and devices including external storage apparatuses such as a hard disk drive (HDD) and a Blu-ray Disc drive, and interfaces such as various buses and terminals (not shown).

In this embodiment, without newly providing a microcomputer dedicated to the changeover of the graphics chips, the EC 6, originally mounted to a notebook type PC to control the input unit and the power supply, is employed to change over the graphics chips. Consequently, the requirement for an additional cost, expansion of a board area, and an increase of power consumption can be suppressed.

(Layer Configuration of Information Processing Apparatus)

Figure 3:
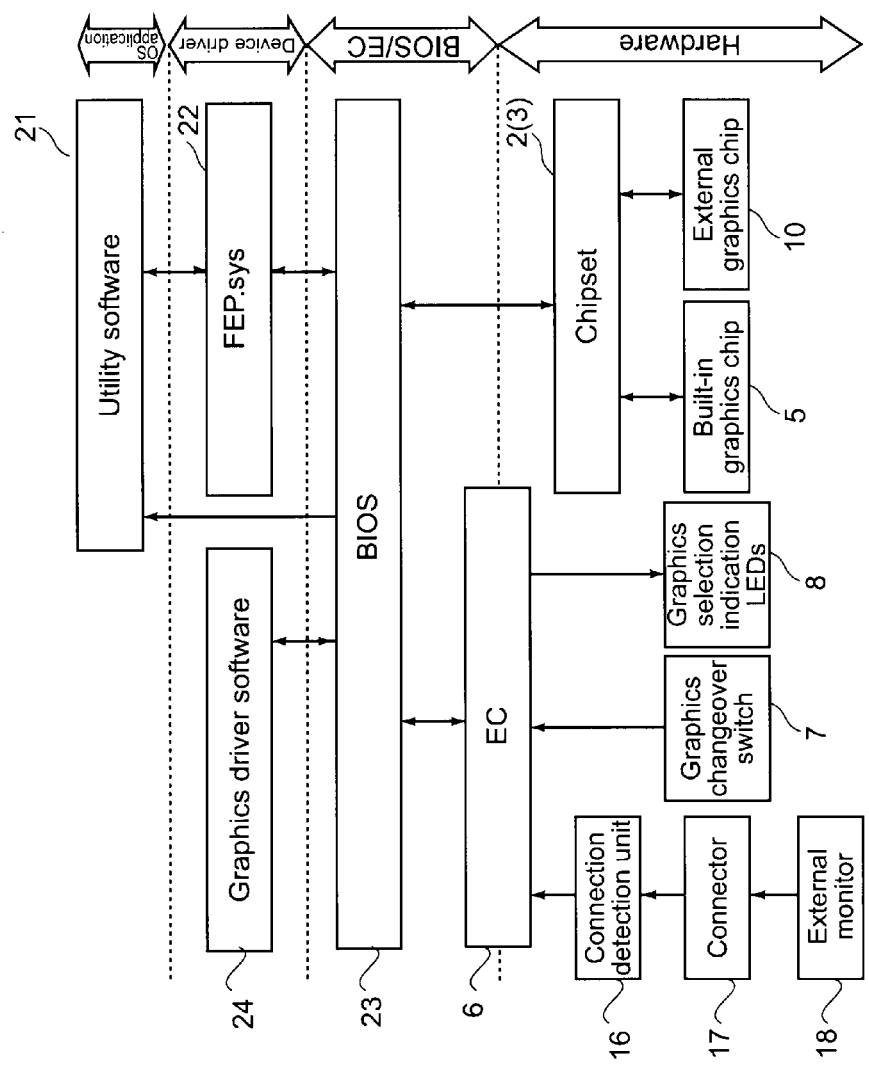
FIG. 3 is a diagram showing a layer configuration of software and hardware of the notebook type PC.

A layer configuration of the software and hardware of the notebook type PC 50 is described. FIG. 3 shows the layer configuration of the software and hardware of the notebook type PC 50.

As shown in FIG. 3, the notebook type PC 50 has software including a BIOS 23, utility software 21 operating on the OS, and an FEP.sys 22 and a graphics driver software 24, hierarchically incorporated on hardware. The hardware includes the chipset 2 (northbridge 3), and the built-in graphics chip 5 and the external graphics chip 10 connected to the chipset 2. The hardware further includes the graphics changeover switch 7, the graphics selection indication LEDs 8 (8a, 8b), the connector 17 connected to the external monitor 18, and the connection detection unit 16 connected to the connector 17. The EC 6 functions as an interface between the hardware and the software.

The utility software 21 makes up for functions of the OS and other application software so as to enhance the functions, performances, and operability thereof. The utility software 21 functions as GUIs for displaying instructions to a user and reflecting the user's intention.

The FEP.sys 22 is a driver software for bridging the utility software 21 operating on the OS and the BIOS 23. In particular, communication between the BIOS 23 and the utility software 21 is performed through the FEP.sys 22. Communication between the BIOS 23 and the EC 6 is performed through the shared memory space on the EC 6. Communication between the utility software 21 and the EC 6 is performed via the FEP.sys 22 and the BIOS 23.

The BIOS 23 is software for performing initialization and testing of the devices immediately after the power supply to the notebook type PC 50 is made available. The BIOS 23 also performs initialization of the graphics chips before the OS starts.

Particularly, the BIOS 23 has a program built therein for performing a process called Power On Self Test (POST) from the start of the system until passing of the control right to the OS such as Windows (registered trademark). It is a principal object of the POST to automatically execute a test of the respective devices when the notebook type PC 50 is powered on so as to check whether the hardware such as the graphics chips, the memories, and the disks is in a normal state. The POST also executes initialization of the graphics chips simultaneously.

The BIOS 23 has a communication interface with respect to the EC 6. The BIOS 23 requests the EC 6 to issue instructions to turn on/off the graphics selection indication LEDs 8 (8a, 8b), to change over the image signal output from the switch IC 12 between the external graphics chip 10 and the built-in graphics chip 5, to turn on/off the external graphics chip power supply circuit 11, to acquire the state of the graphics changeover switch 7, and the like.

The graphics driver software 24 is a device driver for managing graphics drawing. In this embodiment, the graphics driver software 24 also controls the changeover operation of the graphics chips. The graphics driver software 24 acquires the state of the graphics changeover switch 7, and requests the BIOS 23 to change over the graphics chips, after the OS is started. Also, in a case where the utility software 21 requests the graphics driver software 24 to change over the graphics chips via the FEP.sys 22 and the BIOS 23, the graphics driver software 24 requests the BIOS 23 to change over the graphics chips.

(Operation of Information Processing Apparatus)

The changeover operation of the graphics chips in the notebook type PC 50 as structured above will be described.

Figure 4:
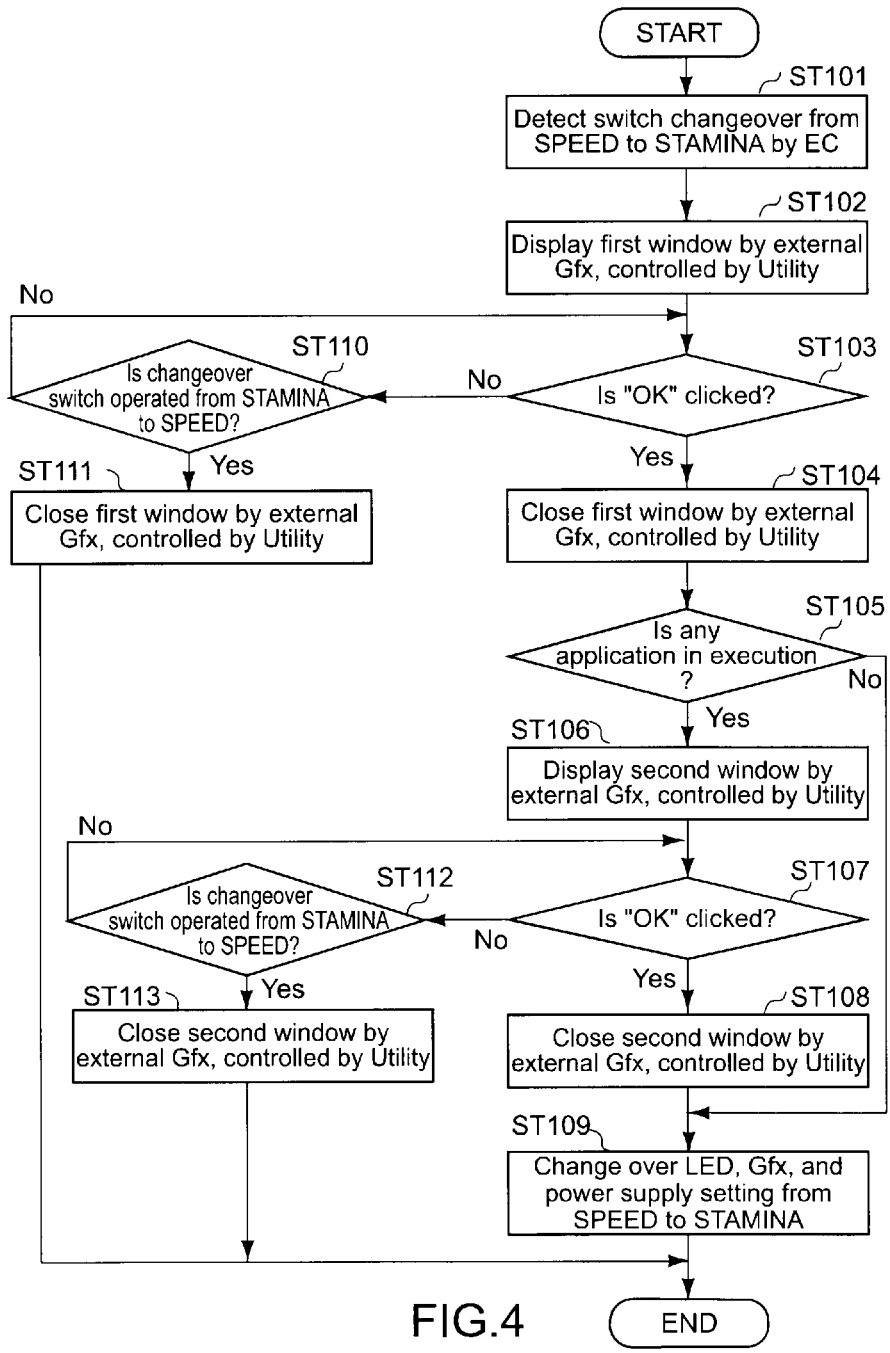
FIG. 4 is a flowchart showing an example of a changeover procedure of graphics chips in the notebook type PC.

FIG. 4 is a flowchart showing an example of a changeover procedure of the graphics chips in the notebook type PC 50. Specifically, FIG. 4 shows the changeover operation where a user operates the graphics changeover switch 7 to the STAMINA side, when the external graphics chip 10 is in execution.

Figure 6:
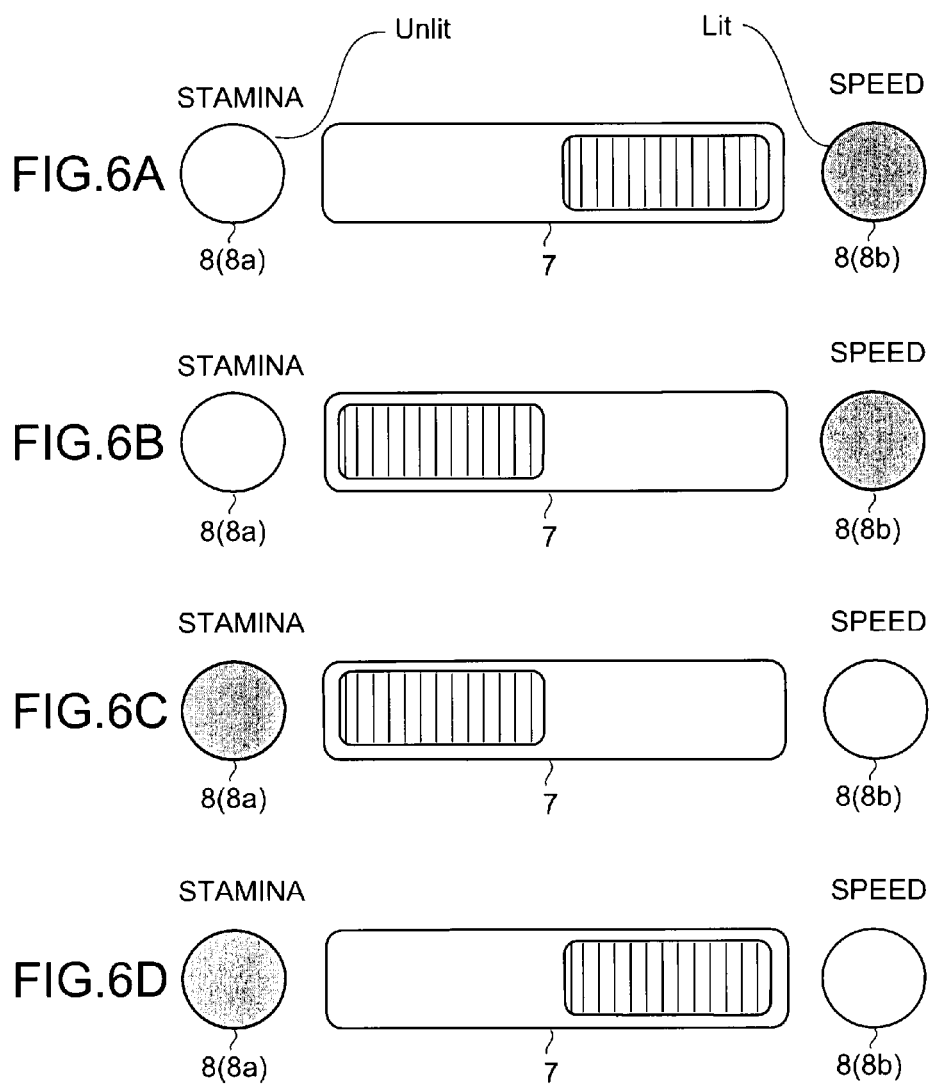
FIG. 6 are explanation diagrams, each showing a graphics changeover switch and graphics selection indication LEDs.

As shown in FIG. 6A, before the graphics changeover switch 7 is operated by a user, the graphics changeover switch 7 is at the SPEED side, the graphics selection indication LED 8b is lit, and the external graphics chip 10 is executed. It should be noted that in FIG. 6, the graphics selection indication LEDs 8 (8a, 8b) in white color indicate they are not lit. The graphics selection indication LEDs 8 (8a, 8b) in gray color indicate they are lit.

As shown in FIG. 4, when the external graphics chip 10 is executed, the EC 6 detects that the graphics changeover switch 7 is operated to the STAMINA side (Step 101, FIG. 6B). The EC 6 notifies the utility software 21 of the changeover via the BIOS 23.

Figure 5:
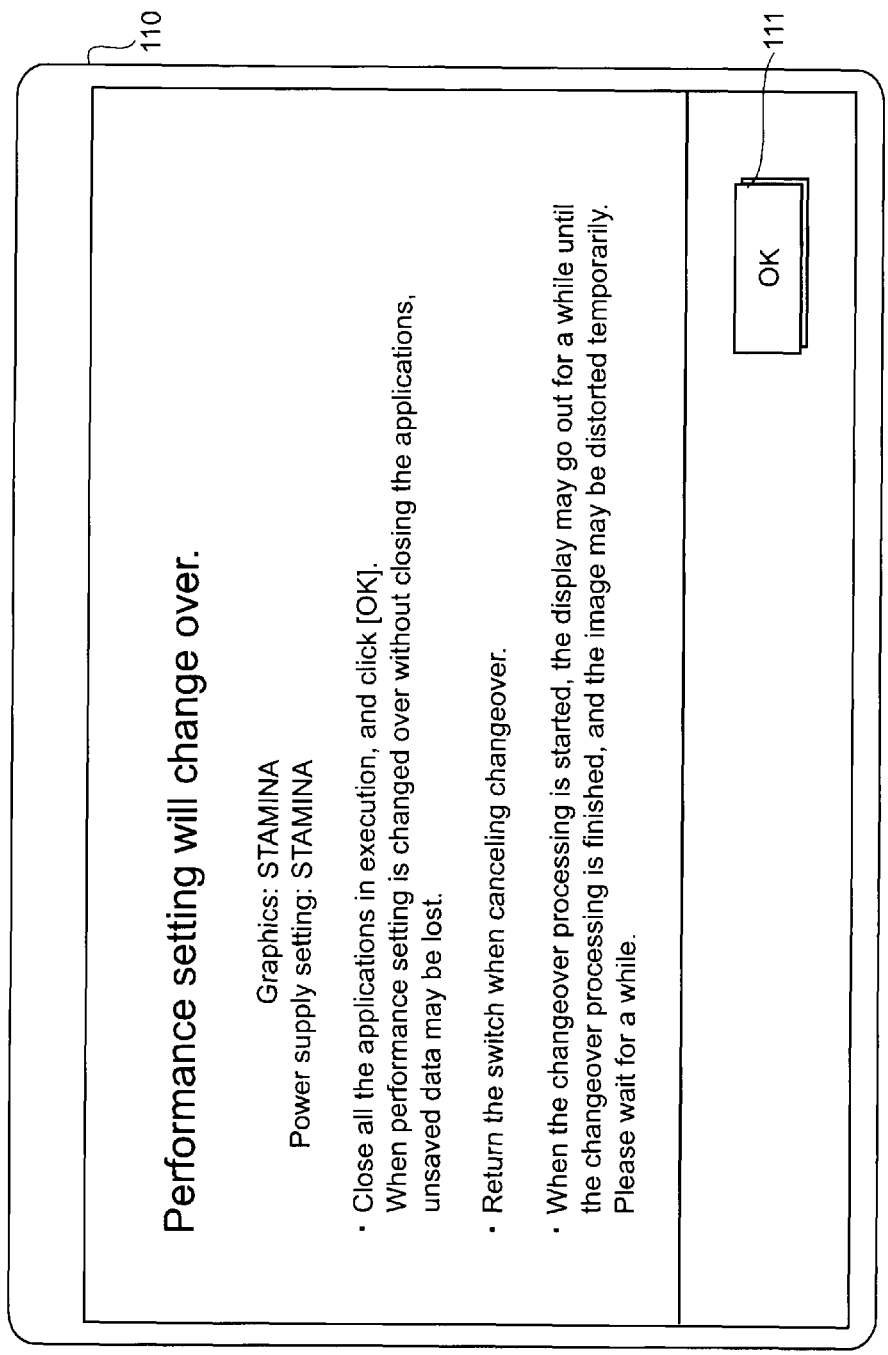
FIG. 5 is a diagram showing a first window.

The utility software 21 receives the notification, and controls the external graphics chip 10 to display a first window 110 of FIG. 5 on the LCD 13 (Step 102).

Specifically, the first window 110 contains the following messages. The first window 110 notifies the user that the graphics chip will be changed over to the STAMINA mode (built-in graphics chip 5), and the power supply setting is changed over to the stamina setting. Further, the first window 110 prompts the user to close all the applications in execution. In a case where the changeover is performed without closing the applications, the applications may abend and unsaved data may be lost. The first window 110 also prompts the user to return the graphics changeover switch 7 to the SPEED side if the user wishes to cancel the changeover. The first window 110 also notifies the user that, when the changeover processing is started, the display may go out for a while until the changeover processing is finished, and the image may be distorted temporarily.

By prompting the user to close the applications as described above, the changeover of the graphics chips can be safely performed. In addition, it is possible to prevent unintended loss of unsaved data resulting from the changeover of the graphics chips.

When the user wishes to change over the modes prompted by the first window 110, the user clicks on "OK" 111 on the first window 110. The utility software 21 detects that the "OK" 111 is clicked (Yes in Step 103).

In this case, the utility software 21 controls the external graphics chip 10 to close the first window 110 (Step 104).

It should be noted that a case where the utility software 21 does not detect the click on the "OK" 111 (No in Step 103) will be described later.

When the external graphics chip 10 closes the first window 110, the utility software 21 judges if there is any application in execution (Step 105).

The judgment of the application in execution is useful as follows. Even in the case where the user wishes to change over the modes and clicks on the "OK" 111 on the first window 110, some of the applications may not be closed. For example, the user may close the applications after clicking on the "OK" 111 to close the first window 110. In such a case, the detection of the applications in execution enables to prevent unintended changeover of the modes.

In a case where the utility software 21 judges that there is no application in execution (No in Step 105), the utility software 21 notifies the BIOS 23 of a graphics chip changeover request via the FEP.sys 22. The BIOS 23 receives the changeover request, and notifies the graphics driver software 24 of the changeover request. The graphics driver software 24 receives the changeover request, and requests the EC 6 to perform processing concerning the changeover via the BIOS 23. The EC 6 receives the request, and outputs the power supply on/off control signal to the external graphics chip power supply circuit 11. The external graphics chip power supply circuit 11 receives the power supply on/off control signal, and stops power supply to the external graphics chip 10. The EC 6 outputs the image changeover signal to the switch IC 12. The switch IC 12 receives the image changeover signal, and controls the changeover of the image signals output from the graphic chips. When the switch IC 12 finishes the changeover processing, the graphics driver software 24 notifies the EC 6 of the completion of the changeover processing via the BIOS 23. The EC 6 receives the notification, and turns off the graphics selection indication LED 8b and turns on the graphics selection indication LED 8a (Step 109, FIG. 6C).

Figure 7:
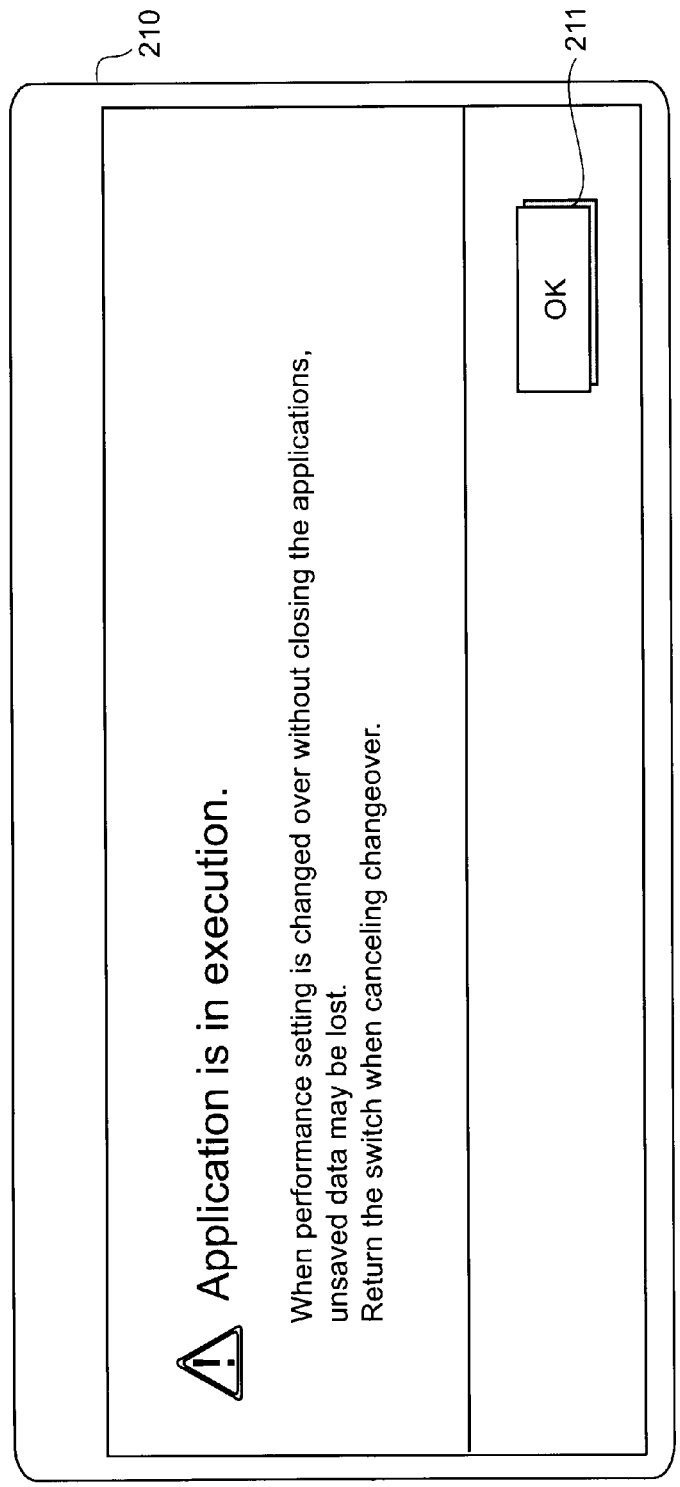
FIG. 7 is a diagram showing a second window.

In a case where the utility software 21 judges that there is an application in execution (Yes in Step 105), the utility software 21 controls the external graphics chip 10. Controlled by the utility software 21, the external graphics chip 10 displays a second window 210 of FIG. 7 on the LCD 13 (Step 106). Specifically, the second window 210 contains the following messages. The second window 210 notifies the user that unsaved data may be lost in a case where the changeover is performed without closing the applications. The second window 210 again prompts the user to close all the applications in execution. The messages on the second window 210 contains stronger wording than the first window 110. The second window 210 also prompts the user to return the graphics changeover switch 7 to the SPEED side if the user wishes to cancel the changeover.

By strongly prompting the user this time to close the applications as described above, the changeover of the graphics chips can be safely performed. In addition, it is possible to prevent unintended loss of unsaved data resulting from the changeover of the graphics chips.

When the user wishes to change over the modes prompted by the second window 210, the user clicks on "OK" 211 on the second window 210. The utility software 21 detects that the "OK" 211 is clicked (Yes in Step 107).

In this case, the utility software 21 controls the external graphics chip 10 to close the second window 210 (Step 108).

It should be noted that a case where the utility software 21 does not detect the click on the "OK" 211 (No in Step 107) will be described later.

When the external graphics chip 10 closes the second window 210, the utility software 21 notifies the BIOS 23 of the graphics chip changeover request via the FEP.sys 22. The BIOS 23 receives the graphics chip changeover request, and notifies the graphics driver software 24 of the changeover request. The graphics driver software 24 receives the changeover request, and requests the EC 6 to perform processing concerning the changeover via the BIOS 23. The EC 6 receives the request, and outputs the power supply on/off control signal to the external graphics chip power supply circuit 11. The external graphics chip power supply circuit 11 receives the power supply on/off control signal, and stops power supply to the external graphics chip 10. The EC 6 outputs the image changeover signal to the switch IC 12. The switch IC 12 receives the image changeover signal, and controls changeover the image signals output from the graphic chips. When the switch IC 12 finishes the changeover processing, the graphics driver software 24 notifies the EC 6 of the completion of the changeover processing via the BIOS 23. The EC 6 receives the notification, and turns off the graphics selection indication LED 8b and turns on the graphics selection indication LED 8a (Step 109, FIG. 6C).

Next, the case where the utility software 21 does not detect the click on the "OK" 111 (No in Step 103) will be described.

In a case where the user for example does not want to close an application and wishes to cancel the changeover to the STAMINA mode, the user returns the graphics changeover switch 7 to the SPEED side without clicking on "OK" 111 on the first window 110. The EC 6 detects that the graphics changeover switch 7 is operated (Yes in Step 110). The operations of Step 103 and Step 111 are repeatedly executed until the EC 6 detects that the graphics changeover switch 7 is operated (No in Step 110).

When the EC 6 detects that the graphics changeover switch 7 is operated, the EC 6 notifies the utility software 21 of the detection of the operation via the BIOS 23. The utility software 21 controls the external graphics chip 10 to close the first window 110 (Step 111).

The procedure ends without changing over the graphics chips.

In the case where the utility software 21 does not detect the click on the "OK" 211 (No in Step 107), the above-mentioned processing will be performed.

That is, in the case where the user for example does not want to close an application and wishes to cancel the changeover to the STAMINA mode, the user returns the graphics changeover switch 7 to the SPEED side without clicking on "OK" 211 on the second window 210. The EC 6 detects that the graphics changeover switch 7 is operated (Yes in Step 112). The operations of Step 107 and Step 112 are repeatedly executed until the EC 6 detects that the graphics changeover switch 7 is operated (No in Step 112).

When the EC 6 detects that the graphics changeover switch 7 is operated, the EC 6 notifies the utility software 21 of the detection of the operation via the BIOS 23. The utility software 21 controls the external graphics chip 10 to close the second window 210 (Step 113). The procedure ends without changing over the graphics chips.

According to the above-mentioned changeover procedure, it is possible to safely changing over from the external graphics chip 10 to the built-in graphics chip 5 by closing all the applications in execution without restarting the notebook type PC 50. In addition, by prompting the user the user to close all the applications in execution one or more times, it is possible to further safely perform the changeover operation. Further, the user is not required to restart the notebook type PC 50, and is only required to close the applications in execution and to operate the changeover switch 7. To the contrary, if a user is required to restart the notebook type PC 50, the user should close the applications in execution, restart the notebook type PC 50, and wait until the notebook type PC 50 restarts, which are bothersome. However, according to the above-mentioned changeover procedure, in addition to closing the applications in execution, the user is only required to operate the changeover switch 7, enhancing convenience for the user.

Next, another example of the changeover procedure of the graphics chips in the notebook type PC 50 will be described.

Figure 8:
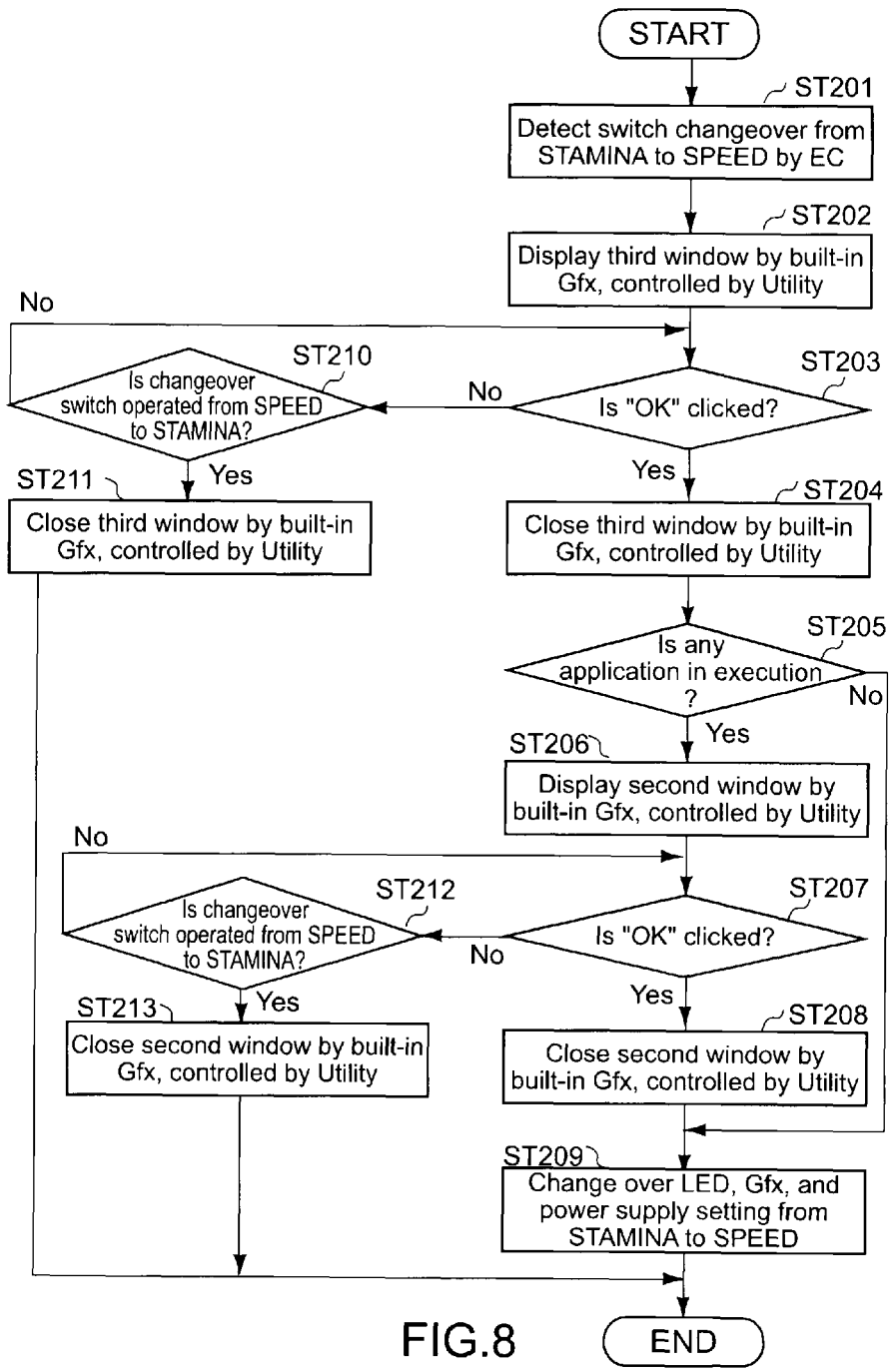
FIG. 8 is a flowchart showing another example of the changeover procedure of the graphics chips in the notebook type PC.

FIG. 8 is a flowchart showing another example of the changeover procedure of the graphics chips in the notebook type PC 50. Specifically, FIG. 8 shows the changeover operation where a user operates the graphics changeover switch 7 to the SPEED side, when the built-in graphics chip 5 is in execution.

As shown in FIG. 6C, before the graphics changeover switch 7 is operated by a user, the changeover switch 7 is at the STAMINA side, and the graphics selection indication LED 8a is lit. Further, the power supply setting is set to the stamina setting, and the built-in graphics chip 5 is executed.

As shown in FIG. 8, when the built-in graphics chip 5 is executed, the EC 6 detects that the graphics changeover switch 7 is operated to the SPEED side (Step 201, FIG. 6D). The EC 6 notifies the utility software 21 of the changeover via the BIOS 23.

Figure 9:
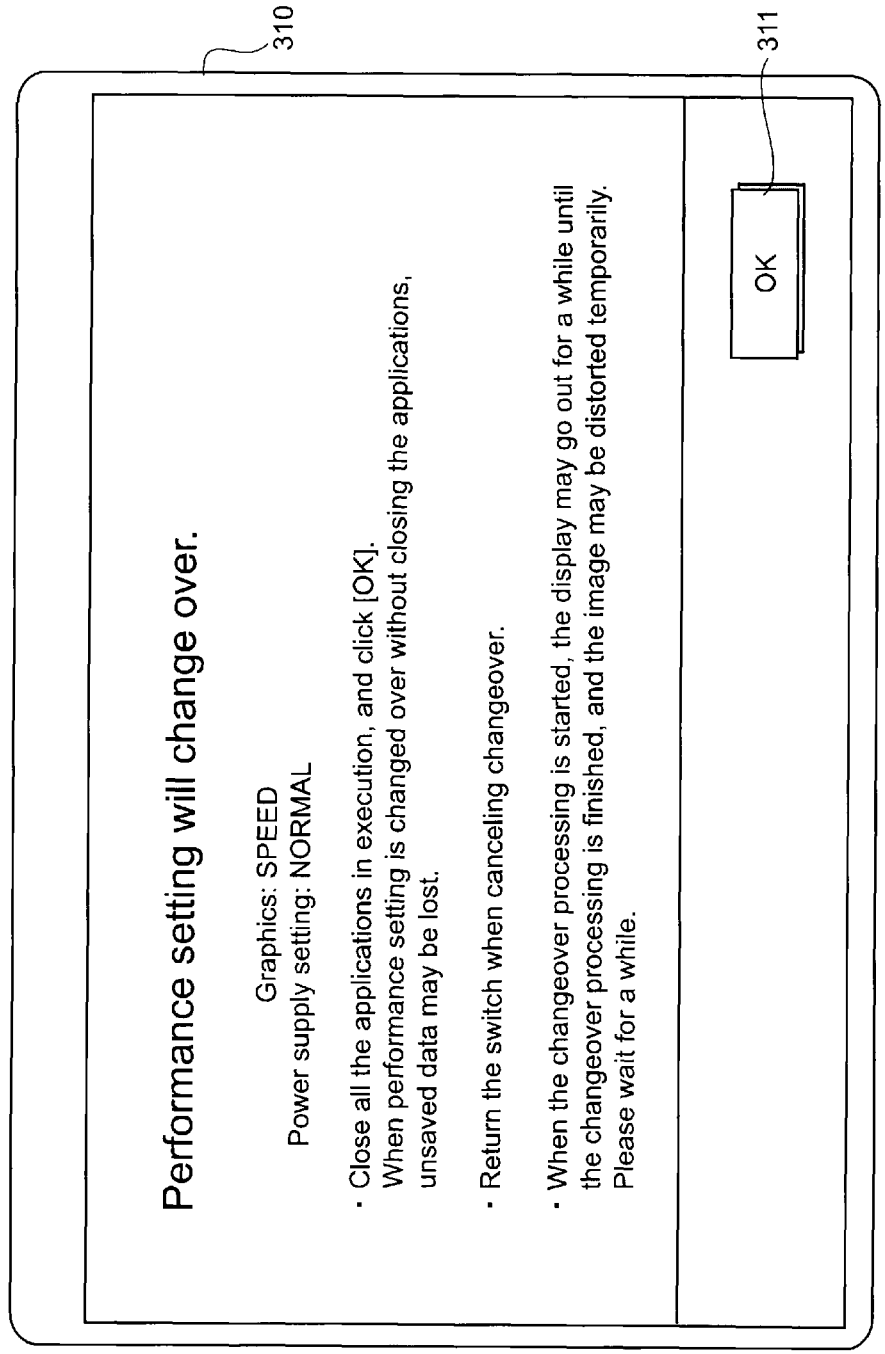
FIG. 9 is a diagram showing a third window.

The utility software 21 receives the notification, and controls the built-in graphics chip 5 to display a third window 310 of FIG. 9 on the LCD 13 (Step 202).

Specifically, the third window 310 contains the following messages. The third window 310 notifies the user that the graphics chip will be changed over to the SPEED mode (external graphics chip 10), and the power supply setting is changed over to the normal setting. Further, the third window 310 prompts the user to close all the applications in execution. In a case where the changeover is performed without closing the applications, the applications may abend and unsaved data may be lost. The third window 310 also prompts the user to return the graphics changeover switch 7 to the STAMINA side if the user wishes to cancel the changeover. The third window 310 also notifies the user that, when the changeover processing is started, the display may go out for a while until the changeover processing is finished, and the image may be distorted temporarily.

By prompting the user to close the applications as described above, the changeover of the graphics chips can be safely performed. In addition, it is possible to prevent unintended loss of unsaved data resulting from the changeover of the graphics chips.

When the user wishes to change over the modes prompted by the third window 310, the user clicks on "OK" 311 on the third window 310. The utility software 21 detects that the "OK" 311 is clicked (Yes in Step 203).

In this case, the utility software 21 controls the built-in graphics chip 5 to close the third window 310 (Step 204).

It should be noted that a case where the utility software 21 does not detect the click on the "OK" 311 (No in Step 203) will be described later.

When the built-in graphics chip 5 closes the third window 310, the utility software 21 judges if there is any application in execution (Step 205).

The judgment of the application in execution is useful as follows. Even in the case where the user wishes to change over the modes and clicks on the "OK" 311 on the third window 310, some of the applications may not be closed. For example, the user may close the applications after clicking on the "OK" 311 to close the third window 310. In such a case, the detection of the applications in execution enables to prevent unintended changeover of the modes.

In a case where the utility software 21 judges that there is no application in execution (No in Step 205), the utility software 21 notifies the BIOS 23 of a graphics chip changeover request via the FEP.sys 22. The BIOS 23 receives the changeover request, and notifies the graphics driver software 24 of the changeover request. The graphics driver software 24 receives the changeover request, and requests the EC 6 to perform processing concerning the changeover via the BIOS 23. The EC 6 receives the request, and outputs the power supply on/off control signal to the external graphics chip power supply circuit 11. The external graphics chip power supply circuit 11 receives the power supply on/off control signal, and starts power supply to the external graphics chip 10. The EC 6 outputs the image changeover signal to the switch IC 12. The switch IC 12 receives the image changeover signal, and controls the changeover of the image signals output from the graphic chips. When the switch IC 12 finishes the changeover processing, the graphics driver software 24 notifies the EC 6 of the completion of the changeover processing via the BIOS 23. The EC 6 receives the notification, and turns off the graphics selection indication LED 8a and turns on the graphics selection indication LED 8b (Step 209, FIG. 6A).

In a case where the utility software 21 judges that there is an application in execution (Yes in Step 205), the utility software 21 controls the built-in graphics chip 5. Controlled by the utility software 21, the built-in graphics chip 5 displays the second window 210 of FIG. 7 on the LCD 13 (Step 206). Specifically, the second window 210 contains the following messages. The second window 210 notifies the user that unsaved data may be lost in a case where the changeover is performed without closing the applications. The second window 210 again prompts the user to close all the applications in execution. The messages on the second window 210 contains stronger wording than the third window 310. The second window 210 also prompts the user to return the graphics changeover switch 7 to the STAMINA side if the user wishes to cancel the changeover.

By strongly prompting the user this time to close the applications as described above, the changeover of the graphics chips can be safely performed. In addition, it is possible to prevent unintended loss of unsaved data resulting from the changeover of the graphics chips.

When the user wishes to change over the modes prompted by the second window 210, the user clicks on "OK" 211 on the second window 210. The utility software 21 detects that the "OK" 211 is clicked (Yes in Step 207).

In this case, the utility software 21 controls the built-in graphics chip 5 to close the second window 210 (Step 208).

It should be noted that a case where the utility software 21 does not detect the click on the "OK" 211 (No in Step 207) will be described later.

When the built-in graphics chip 5 closes the second window 210, the utility software 21 notifies the BIOS 23 of the graphics chip changeover request via the FEP.sys 22. The BIOS 23 receives the graphics chip changeover request, and notifies the graphics driver software 24 of the changeover request. The graphics driver software 24 receives the changeover request, and requests the EC 6 to perform processing concerning the changeover via the BIOS 23. The EC 6 receives the request, and outputs the power supply on/off control signal to the external graphics chip power supply circuit 11. The external graphics chip power supply circuit 11 receives the power supply on/off control signal, and starts power supply to the external graphics chip 10. The EC 6 outputs the image changeover signal to the switch IC 12. The switch IC 12 receives the image changeover signal, and controls changeover the image signals output from the graphic chips. When the switch IC 12 finishes the changeover processing, the graphics driver software 24 notifies the EC 6 of the completion of the changeover processing via the BIOS 23. The EC 6 receives the notification, and turns off the graphics selection indication LED 8a and turns on the graphics selection indication LED 8b (Step 209, FIG. 6A).

Next, the case where the utility software 21 does not detect the click on the "OK" 311 (No in Step 203) will be described.

In a case where the user for example does not want to close an application and wishes to cancel the changeover to the SPEED mode, the user returns the graphics changeover switch 7 to the STAMINA side without clicking on "OK" 311 on the third window 310. The EC 6 detects that the graphics changeover switch 7 is operated (Yes in Step 210). The operations of Step 203 and Step 211 are repeatedly executed until the EC 6 detects that the graphics changeover switch 7 is operated (No in Step 210).

When the EC 6 detects that the graphics changeover switch 7 is operated, the EC 6 notifies the utility software 21 of the detection of the operation via the BIOS 23. The utility software 21 controls the built-in graphics chip 5 to close the third window 310 (Step 211).

The procedure ends without changing over the graphics chips.

In the case where the utility software 21 does not detect the click on the "OK" 211 (No in Step 207), the above-mentioned processing will be performed.

That is, in the case where the user for example does not want to close an application and wishes to cancel the changeover to the SPEED mode, the user returns the graphics changeover switch 7 to the STAMINA side without clicking on "OK" 211 on the second window 210. The EC 6 detects that the graphics changeover switch 7 is operated (Yes in Step 212). The operations of Step 207 and Step 212 are repeatedly executed until the EC 6 detects that the graphics changeover switch 7 is operated (No in Step 212).

When the EC 6 detects that the graphics changeover switch 7 is operated, the EC 6 notifies the utility software 21 of the detection of the operation via the BIOS 23. The utility software 21 controls the built-in graphics chip 5 to close the second window 210 (Step 213).

The procedure ends without changing over the graphics chips.

Next, another example of the changeover procedure of the graphics chips in the notebook type PC 50 will be described.

Figure 10:
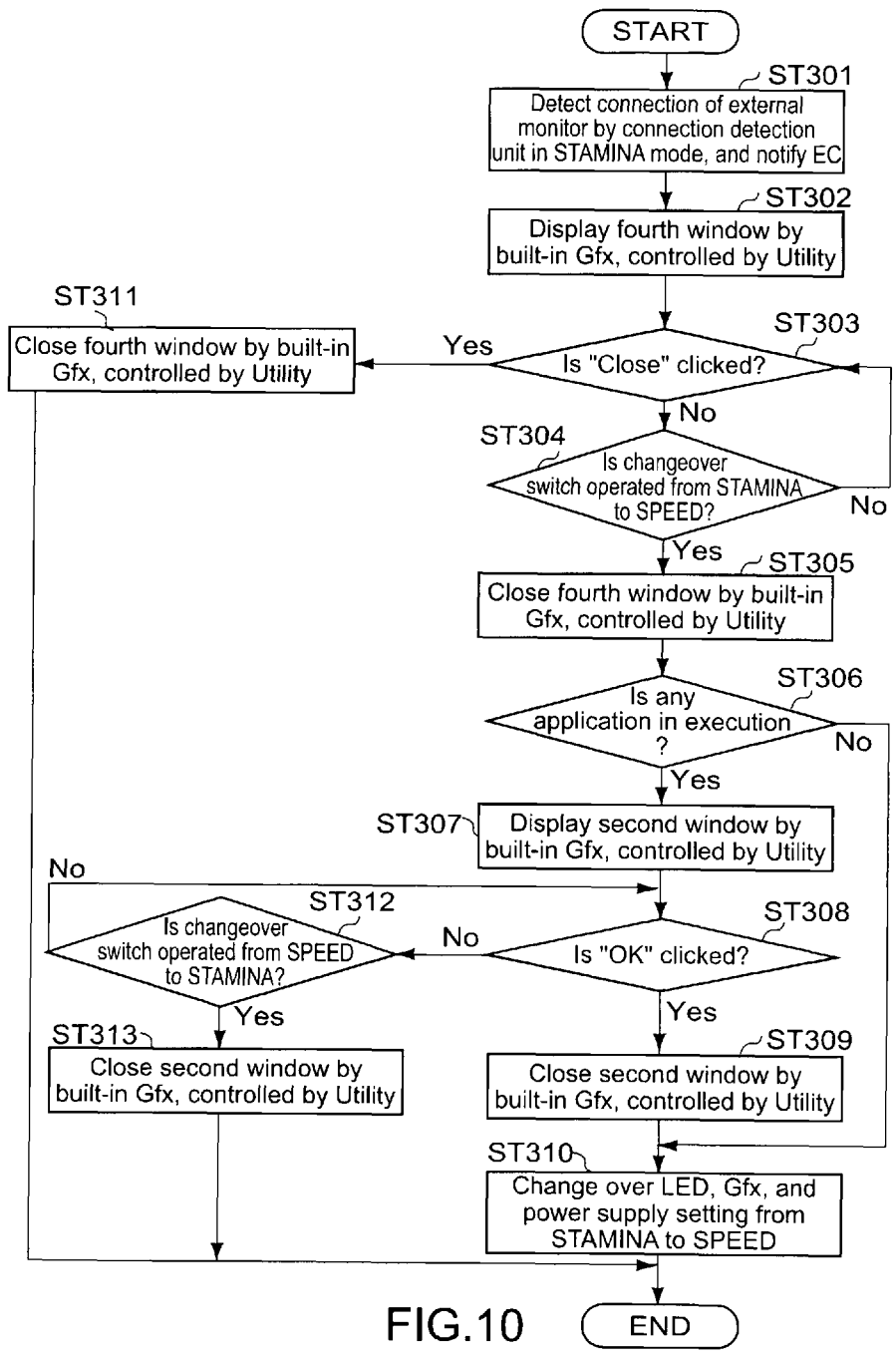
FIG. 10 is a flowchart showing another example of the changeover procedure of the graphics chips in the notebook type PC.

FIG. 10 is a flowchart showing another example of the changeover procedure of the graphics chips in the notebook type PC 50. Specifically, FIG. 10 shows the changeover operation where the external monitor 18, not supported by the built-in graphics chip 5, is connected to the connecter 17 of the notebook type PC 50 via the HDMI terminal or the DVI terminal, when the built-in graphics chip 5 is in execution.

As shown in FIG. 6C, before the graphics changeover switch 7 is operated by the user, the graphics changeover switch 7 is at the STAMINA side, and the graphics selection indication LED 8a is lit. Further, the power supply setting is set to the stamina setting, and the built-in graphics chip 5 is executed.

As shown in FIG. 10, the connection detection unit 16 detects that the external monitor 18 is connected to the connector 17 when the built-in graphics chip 5 is executed (Step 301), the connection detection unit 16 notifies the EC6 of the connection of the external monitor 18. The EC 6 receives the notification, and notifies the utility software 21 of the connection of the external monitor 18 via the BIOS 23.

Figure 11:
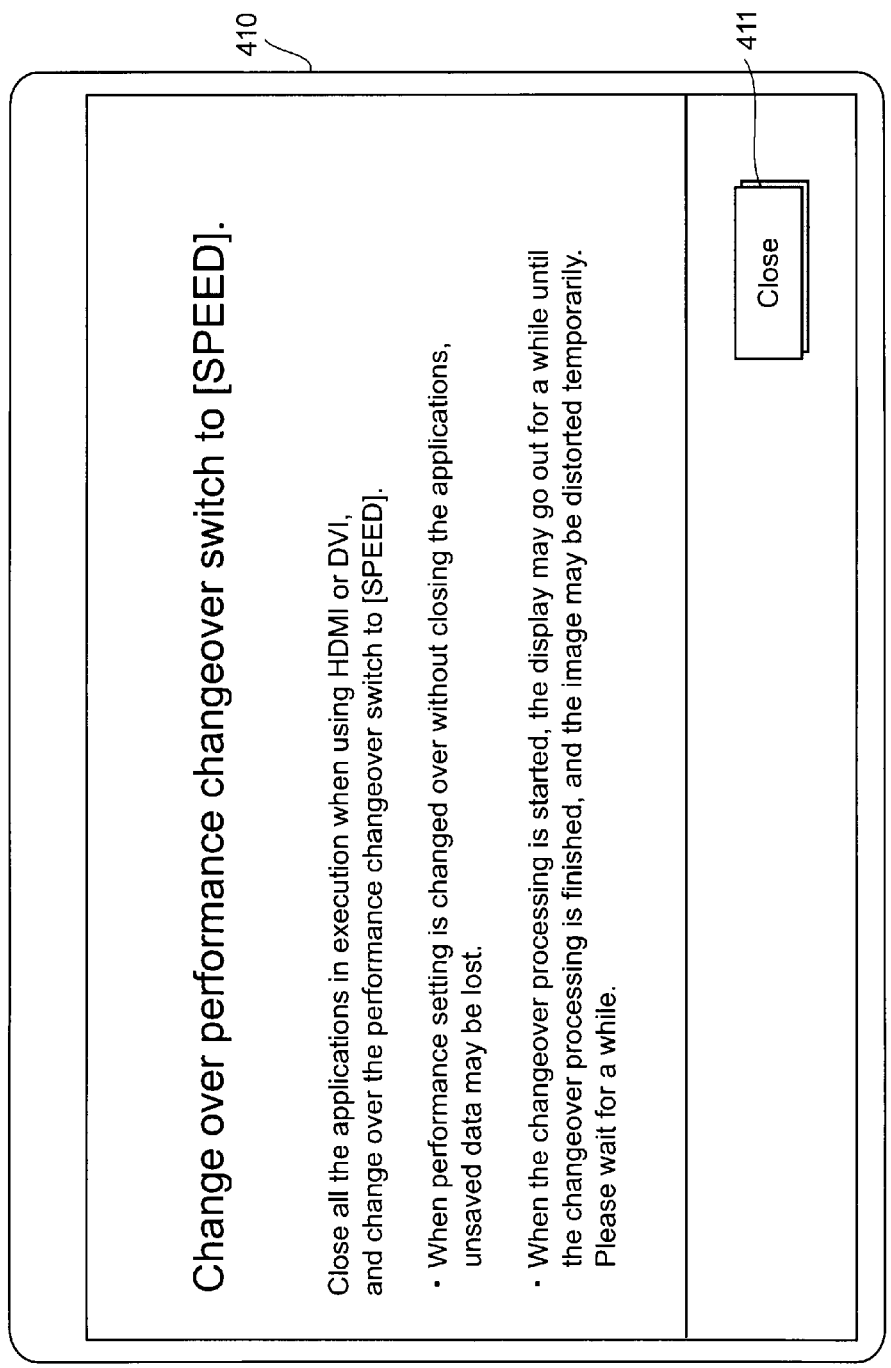
FIG. 11 is a diagram showing a fourth window.

The utility software 21 receives the notification, and controls the built-in graphics chip 5 to display a fourth window 410 of FIG. 11 on the LCD 13 (Step 302).

Specifically, the fourth window 410 contains the following messages. The fourth window 410 prompts the user to operate the graphics changeover switch 7 to the SPEED side, because the HDMI terminal and the DVI terminal is not supported by the built-in graphics chip 5.

Further, the fourth window 410 prompts the user to close all the applications in execution. In a case where the changeover is performed without closing the applications, the applications may abend and unsaved data may be lost. The fourth window 410 also notifies the user that, when the changeover processing is started, the display may go out for a while until the changeover processing is finished, and the image may be distorted temporarily.

As described above, even in the case where the user has no intention to change over the graphics chips, when the external monitor 18, not supported by the built-in graphics chip 5, is connected, the user is prompted to operate the graphics changeover switch 7. The above procedure thus prevents unintended changeover of the graphics chips for enabling the use of the external monitor 18. The above procedure further prevents a case where the external monitor 18 is not driven because the graphics chips are not changed over even though the external monitor 18 is mechanically connected. Further, by prompting the user to close the applications, the changeover of the graphics chips can be safely performed.

In addition, it is possible to prevent unintended loss of unsaved data resulting from the changeover of the graphics chips.

When the user has no intention to use the external monitor 18 even though the external monitor 18 is mechanically connected, the user clicks on "Close" 411 on the fourth window 410. The utility software 21 detects that the "Close" 411 is clicked (Yes in Step 303). Detecting that the "Close" 411 is clicked, the utility software 21 controls the built-in graphics chip 5 to close the fourth window 410 (Step 311). The procedure of the changeover processing ends.

Next, the case where the utility software 21 does not detect the click on the "Close" 411 on the fourth window 410 will be described (No in Step 303). When the user wishes to change over to the SPEED mode prompted by the fourth window 410, the user operates the graphics changeover switch 7 to the SPEED side. The utility software 21 detects that the graphics changeover switch 7 is operated to the SPEED side before detecting the click on "Close" 411 (Yes in Step 304, FIG. 6D).

The operations of Step 303 and Step 304 are repeatedly executed until the EC 6 detects that the graphics changeover switch 7 is operated (No in Step 304). When the utility software 21 detects the operation of the graphics changeover switch 7, the utility software 21 controls the built-in graphics chip 5 to close the fourth window 410 (Step 305).

When the built-in graphics chip 5 closes the fourth window 410, the utility software 21 judges if there is any application in execution (Step 306).

The judgment of the application in execution is useful as follows. Even in the case where the user wishes to change over the modes and operates the graphics changeover switch 7 to the SPEED side and the utility software 21 detects the operation of the graphics changeover switch 7, some of the applications may not be closed. For example, the user may close the applications after operating the graphics changeover switch 7 to the SPEED side. In such a case, the detection of the applications in execution enables to prevent unintended changeover of the modes.

In a case where the utility software 21 judges that there is no application in execution (No in Step 306), the utility software 21 notifies the BIOS 23 of a graphics chip changeover request via the FEP.sys 22. The BIOS 23 receives the changeover request, and notifies the graphics driver software 24 of the changeover request. The graphics driver software 24 receives the changeover request, and requests the EC 6 to perform processing concerning the changeover via the BIOS 23. The EC 6 receives the request, and outputs the power supply on/off control signal to the external graphics chip power supply circuit 11. The external graphics chip power supply circuit 11 receives the power supply on/off control signal, and starts power supply to the external graphics chip 10. The EC 6 outputs the image changeover signal to the switch IC 12. The switch IC 12 receives the image changeover signal, and controls the changeover of the image signals output from the graphic chips. When the switch IC 12 finishes the changeover processing, the graphics driver software 24 notifies the EC 6 of the completion of the changeover processing via the BIOS 23. The EC 6 receives the notification, and turns off the graphics selection indication LED 8a and turns on the graphics selection indication LED 8b (Step 310, FIG. 6A).

In a case where the utility software 21 judges that there is an application in execution (Yes in Step 306), the utility software 21 controls the built-in graphics chip 5. Controlled by the utility software 21, the built-in graphics chip 5 displays the second window 210 of FIG. 7 on the LCD 13 (Step 307).

When the user wishes to change over the modes prompted by the second window 210, the user clicks on "OK" 211 on the second window 210. The utility software 21 detects that the "OK" 211 is clicked (Yes in Step 308).

In this case, the utility software 21 controls the built-in graphics chip 5 to close the second window 210 (Step 309).

It should be noted that a case where the utility software 21 does not detect the click on the "OK" 211 (No in Step 308) will be described later.

In the case where the built-in graphics chip 5 closes the second window 210, the utility software 21 notifies the BIOS 23 of the graphics chip changeover request via the FEP.sys 22. The BIOS 23 receives the graphics chip changeover request, and notifies the graphics driver software 24 of the changeover request. The graphics driver software 24 receives the changeover request, and requests the EC 6 to perform processing concerning the changeover via the BIOS 23. The EC 6 receives the request, and outputs the power supply on/off control signal to the external graphics chip power supply circuit 11. The external graphics chip power supply circuit 11 receives the power supply on/off control signal, and starts power supply to the external graphics chip 10. The EC 6 outputs the image changeover signal to the switch IC 12. The switch IC 12 receives the image changeover signal, and controls changeover the image signals output from the graphic chips. When the switch IC 12 finishes the changeover processing, the graphics driver software 24 notifies the EC 6 of the completion of the changeover processing via the BIOS 23. The EC 6 receives the notification, and turns off the graphics selection indication LED 8a and turns on the graphics selection indication LED 8b (Step 310, FIG. 6A).

Next, the case where the utility software 21 does not detect the click on the "OK" 211 will be described (No in Step 308).

In a case where the user for example does not want to close an application and wishes to cancel the changeover to the SPEED mode, the user returns the graphics changeover switch 7 to the STAMINA side without clicking on "OK" 211 on the second window 210. The EC 6 detects that the graphics changeover switch 7 is operated (Yes in Step 312).

The operations of Step 308 and Step 312 are repeatedly executed until the EC 6 detects that the graphics changeover switch 7 is operated (No in Step 312).

When the EC 6 detects that the graphics changeover switch 7 is operated, the EC 6 notifies the utility software 21 of the detection of the operation via the BIOS 23. The utility software 21 controls the built-in graphics chip 5 to close the second window 210 (Step 313).

The procedure ends without changing over the graphics chips.

It should be noted that the changeover procedure of FIG. 10 is not limited to the case where the external monitor 18 not supported by the built-in graphics chip 5 is connected to the connector 17. For example, the changeover procedure of FIG. 10 may be performed when connecting an alternating current (AC) adapter to the connector 17, driving a Blu-ray Disc drive, executing a 3-D application, displaying a high-resolution image, and the like.

FIG. 10 shows the changeover procedure of prompting the user to change over to the external graphics chip 10 when the built-in graphics chip 5 is in execution. Alternatively, it is possible to perform another changeover procedure of prompting the changeover to the built-in graphics chip 5 when the external graphics chip 10 is in execution. This changeover procedure is useful, for example, in a case where the AC adapter is removed, a battery value is decreased to a threshold, and temperature of the battery is increased to a threshold, and in a case of lowering rpm of the fan 14 to decrease a noise.

In the changeover procedure of prompting the changeover to the built-in graphics chip 5 when the external graphics chip 10 is in execution, for example, in Step 301, the utility software 21 may detect that the battery value is decreased to the threshold. In Step 302, the utility software 21 may control the external graphics chip 10 to display a window for prompting the user to operate the graphics changeover switch 7 to the STAMINA side. In Step 304, the EC 6 may detect that the graphics changeover switch 7 is operated to the STAMINA side. In Step 312, the EC 6 may detect the changeover of the graphics changeover switch 7 to the SPEED side. In Step 310, the EC 6 may turn off the graphics selection indication LED 8b and turns on the graphics selection indication LED 8a (FIG. 6C). Further, the EC 6 may output the power supply on/off control signal to the external graphics chip power supply circuit 11 to stop power supply to the external graphics chip 10. The EC 6 may further output the image changeover signal to the switch IC 12 to control changeover of the image signals output from the graphic chips.

In the changeover procedure of prompting the user to change over to the built-in graphics chip 5 when the external graphics chip 10 is in execution, Steps 301, 302, 304, 310, and 312 of the changeover procedure of FIG. 10 are replaced by the above-mentioned steps.

Next, another example of the changeover procedure of the graphics chips in the notebook type PC 50 will be described.

Figure 12:
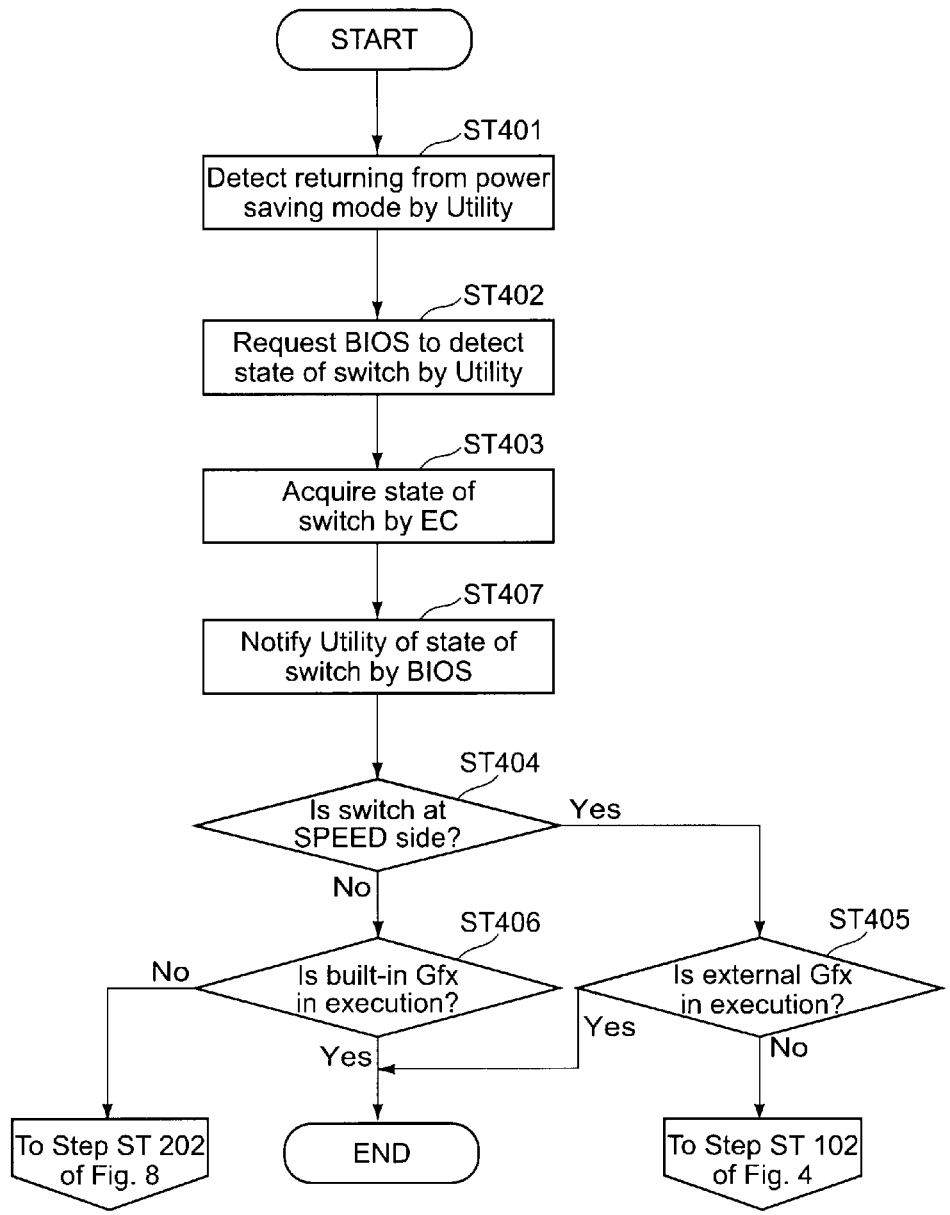
FIG. 12 is a flowchart showing operations in a case where an OS returns from a power saving mode in the notebook type PC.

FIG. 12 is a flowchart showing operations in a case where the OS returns from a power saving mode. The power saving mode here is a standby (suspended) mode or a rest mode (hibernation).

The utility software 21 detects that the OS in the power saving mode returns to the original state (Step 401). When the OS returns from the power saving mode, the graphics chip that was executed before the OS was in the power save mode is always executed irrespective of position of the graphics changeover switch 7. For example, in a case where the built-in graphics chip 5 was executed before the OS was in the power save mode, the built-in graphics chip 5 is executed when returning from the power save mode even though the graphics changeover switch 7 is at the SPEED side.

Detecting that the OS returns from the power saving mode, the utility software 21 requests the BIOS 23 to detect by the EC 6 the state of the graphics changeover switch 7 via the FEP.sys 22 (Step 402).

The EC 6 receives the requests, and acquires the state of the graphics changeover switch 7 (Step 403). The BIOS 23 notifies the utility software 21 of the state of the graphics changeover switch 7 and the state of the graphics chip in execution (Step 407).

In a case where the utility software 21 judges that the graphics changeover switch 7 is at the SPEED side (Yes in Step 404), when the external graphics chip 10 is in execution (Yes in Step 405, FIG. 6A), the procedure ends. The state of the graphics changeover switch 7 corresponds to the graphics chip in execution, leading to no problem.

A case where the graphics changeover switch 7 is at the SPEED side (Yes in Step 404) and the built-in graphics chip 5 is in execution (No in Step 405, FIG. 6D) will be described. That is, the built-in graphics chip 5 was executed before the OS was in the power saving mode, and the graphics changeover switch 7 was operated to the SPEED side by the user during the power saving mode. In this case, the changeover processing of Step 102 to Step 113 of FIG. 4 will be performed.

Meanwhile, in a case where the utility software 21 judges that the graphics changeover switch 7 is at the STAMINA side (No in Step 404), when the built-in graphics chip 5 is in execution (Yes in Step 406, FIG. 6C), the procedure ends. The state of the graphics changeover switch 7 corresponds to the graphics chip in execution, leading to no problem.

A case where the graphics changeover switch 7 is at the STAMINA side (No in Step 404) and the external graphics chip 10 is in execution (No in Step 406, FIG. 6B) will be described. That is, the external graphics chip 10 was executed before the OS was in the power saving mode, and the graphics changeover switch 7 was operated to the STAMINA side by the user during the power saving mode. In this case, the changeover processing of Step 202 to Step 213 of FIG. 8 will be performed.

According to the embodiment of the present invention, in the case where the graphics changeover switch 7 is operated by the user, the windows for prompting the user to change over the graphics chips safely and easily are displayed. Further, in the case where it is preferable to change over the graphics chips, the windows for prompting the user to change over the graphics chips safely and easily are displayed. Accordingly, convenience for the user is enhanced, and at the same time the safety of the information processing apparatus is enhanced.

It should be understood by those skilled in the art that various modifications, combinations, sub-combinations and alterations may occur depending on design requirements and other factors insofar as they are within the scope of the appended claims or the equivalents thereof.

For example, Steps 110, 112, 210, 212, and 312 are repeatedly performed until the EC 6 detects the operations of the graphics changeover switch 7. Not limited to the above, the utility software 21 may control the graphics chips to close the windows after the elapse of a predetermined period of time.

Further, in Step 102 and Step 202, the utility software 21 controls the graphics chips to display the first window 110 and the second window 210 irrespective of the presence or absence of an application in execution.

Not limited to the above, prior to Step 102 and Step 202, the utility software 21 may confirm if there is any application in execution. In a case where if there is no application in execution, the utility software 21 may change over the graphics chips (Step 109 and Step 209) without displaying the first window 110 and the second window 210.

The present application contains subject matter related to that disclosed in Japanese Priority Patent Application JP 2008-181360 filed in the Japanese Patent Office on Jul. 11, 2008, the entire contents of which is hereby incorporated by reference.

What is claimed is:
1. An information processing apparatus, comprising:
a first graphics chip having a first drawing processing capacity;

a second graphics chip having a second drawing processing capacity different from the first drawing processing capacity; and circuitry configured to:

detect a request to change over from an execution of the first graphics chip to an execution of the second graphics chip;

control a display to display a first window prompting to close an application in execution when the request to change over from the execution of the first graphics chip to the execution of the second graphics chip is detected, wherein the first window does not include a prompt to shut down or restart the information processing apparatus;

determine, after displaying the first window, whether the application in execution is closed; and control changing over from an execution of the first graphics chip to an execution of the second graphics chip when it is determined that the application in execution is closed or no application is in execution.

2. The information processing apparatus according to claim 1, wherein the circuitry is configured to:

determine whether the application in execution is closed when the first window is no longer displayed by the display; and control the display to display a second window prompting again to close the application in execution when it is determined that the application in execution is yet to be closed.

3. The information processing apparatus according to claim 1, further comprising:

a user interface configured to accept an input operation for changing over from the execution of the first graphics chip to the execution of the second graphics chip, wherein the circuitry is configured to control changing over from the execution of the first graphics chip to the execution of the second graphics chip based on the input operation accepted by the user interface.

4. The information processing apparatus according to claim 3, wherein the circuitry is configured to detect the input operation accepted by the user interface.

5. The information processing apparatus according to claim 3, wherein the circuitry is configured to detect a request to generate an output signal for the second graphics chip, and the first window further prompts to input the operation to the user interface.

6. The information processing apparatus according to claim 3, wherein the circuitry is configured to detect returning from a power saving mode, and the first window further prompts to input an operation to the user interface.

7. The information processing apparatus according to claim 1, wherein the circuitry is configured to perform the determining and changing over from execution of the first graphics chip to execution of the second graphics chip without restarting the information processing apparatus.

8. The information processing apparatus according to claim 1, wherein the circuitry is configured to perform the determining and changing over from execution of the first graphics chip to execution of the second graphics chip without shutting down the information processing apparatus.

9. An information processing method performed by an information processing apparatus, the method comprising:

detecting a request to change over from an execution of a first graphics chip having a first drawing processing capacity to an execution of a second graphics chip having a second drawing processing capacity different from the first drawing processing capacity;

controlling a display to display a first window prompting to close an application in execution when the request to change over from the execution of the first graphics chip to the execution of the second graphics chip is detected, wherein the first window does not include a prompt to shut down or restart the information processing apparatus;

determining, after displaying the first window, whether the application in execution is closed; and controlling changing over from an execution of the first graphics chip to an execution of the second graphics chip when it is determined that the application in execution is closed or no application is in execution.

10. The information processing method according to claim 9, further comprising:

controlling the display to end the display of the first window, and determining whether the application in execution is closed; and controlling the display to display a second window prompting again to close the application in execution when it is determined that the application in execution is yet to be closed.

11. The information processing method according to claim 9, further comprising:

accepting an input operation for changing over from the execution of the first graphics chip to the execution of the second graphics chip; and changing over from the execution of the first graphics chip to the execution of the second graphics chip, based on the input operation.

12. The information processing method according to claim 9, wherein the determining and controlling changing over from execution of the first graphics chip to execution of the second graphics chip are performed without restarting the information processing apparatus.

13. The information processing method according to claim 9, wherein the determining and controlling changing over from execution of the first graphics chip to execution of the second graphics chip are performed without shutting down the information processing apparatus.

14. A non-transitory computer-readable medium including a program, causing an information processing apparatus to execute the steps of:

detecting a request to change over from an execution of a first graphics chip having a first drawing processing capacity to an execution of a second graphics chip having a second drawing processing capacity different from the first drawing processing capacity;

controlling a display to display a first window prompting to close an application in execution when the request to change over from the execution of the first graphics chip to the execution of the second graphics chip is detected, wherein the first window does not include a prompt to shut down or restart the information processing apparatus;

determining, after displaying the first window, whether the application in execution is closed; and controlling changing over from an execution of the first graphics chip to an execution of the second graphics chip when it is determined that the application in execution is closed or no application is in execution.

15. The non-transitory computer-readable medium according to claim 14, the program further causing the information processing apparatus to execute the steps of:

controlling the display to end the display of the first window, and determine whether the application in execution is closed; and controlling the display to display a second window prompting again to close the application in execution when it is determined that the application in execution is yet to be closed.

16. The non-transitory computer-readable medium according to claim 14, the program further causing the information processing apparatus to execute the steps of:

accepting an input operation for changing over from the execution of the first graphics chip to the execution of the second graphics chip; and changing over from the execution of the first graphics chip to the execution of the second graphics chip, based on the input of the operation.

17. The non-transitory computer-readable medium according to claim 14, wherein the determining and controlling changing over from execution of the first graphics chip to execution of the second graphics chip are performed without restarting the information processing apparatus.

18. The non-transitory computer-readable medium according to claim 14, wherein the determining and controlling changing over from execution of the first graphics chip to execution of the second graphics chip are performed without shutting down the information processing apparatus.

* * * * *